United States Patent [19]

Dugge

[11] 4,248,552
[45] Feb. 3, 1981

[54] END CAP ARRANGEMENT UTILIZING LARGE HEADED BOLTS

[75] Inventor: Richard H. Dugge, St. Louis, Mo.

[73] Assignee: ACF Industries, Incorporated, New York, N.Y.

[21] Appl. No.: 44,839

[22] Filed: Jun. 1, 1979

[51] Int. Cl.³ .............................................. B65G 53/52
[52] U.S. Cl. ..................................... 406/129; 406/145
[58] Field of Search ................ 406/129, 145; 222/545, 222/556; 105/247, 280, 283

[56] References Cited

U.S. PATENT DOCUMENTS

| | | | |
|---|---|---|---|
| 3,048,448 | 8/1962 | Aller | 406/145 X |
| 3,482,741 | 12/1969 | Fritz | 406/145 X |
| 4,151,935 | 5/1979 | Dugge | 406/145 X |

*Primary Examiner*—Jeffrey V. Nase
*Attorney, Agent, or Firm*—Henry W. Cummings

[57] ABSTRACT

In a pneumatic discharge outlet a rotatable discharge conduit attached to a rotatable lading control valve extends outboard of the outlet end wall. Operating handles to move the lading control valve between open and closed positions are located on the discharge conduit. Laterally spaced, large headed bolts extending outwardly parallel to the discharge conduit, are threaded into respective threaded portions of the operating handles. An outlet end cap includes laterally spaced end cap lugs having openings through which the large headed bolts pass. In closed position the heads of the large headed bolts engage the end cap lugs to hold the end cap in closed position. To remove the end cap the large headed bolts are rotated an amount sufficient to free the end cap lugs from the large headed bolts so that the end cap may be removed from the discharge conduit. The large headed bolts have bolt stops attached to their inner ends to prevent removal of the bolts when the end cap is removed. At least one end wall stop is provided on each outlet end sheet located relative to the inner end of the large headed bolts such that at least one of the large headed bolts and, hence the operating handle, cannot be rotated when the large headed bolt is in engaged position with the end cap. Furthermore, a sample can be taken from the near end of the outlet without the large headed bolt at the far end of the outlet abutting the end wall stop at the far end.

6 Claims, 3 Drawing Figures

END CAP ARRANGEMENT UTILIZING LARGE HEADED BOLTS

BACKGROUND OF THE INVENTION

In U.S. Pat. No. 3,778,114 a pneumatic outlet is disclosed having a control valve which is movable between open and closed positions relative to a discharge opening in the outlet by operating handles located at opposite ends of the outlet.

U.S. Pat. No. 3,701,460 discloses a bail assembly including a locking lever for this outlet in which a sample of the lading may be taken from one end of the outlet by removing the bail from one end only of the outlet. The end cap and bail arrangement disclosed in U.S. Pat. No. 3,701,460 is disadvantageous for the following reasons. It is expensive and difficult to manufacture. Because of dimensional tolerances in the end cap and bail assembly it is difficult to actuate the bail members and obtain proper clamping force within the locking lever to secure the end caps. In some instances when the bail is in stored position it will interfere with the rotation of the control valve. There are points on the bail arrangement where the operator can pinch his fingers and/or crack his knuckles. Furthermore, the bail is heavy and adds to the weight of the outlet. Because of these disadvantages, injuries occur to operators, and end caps are often not properly installed when cars are shipped, leading to end cap breakage in transit.

U.S. Pat. No. 4,163,583 granted Aug. 7, 1979, discloses an end cap arrangement in which large headed bolts connected to vertically extending "J"-shaped locking members maintain the end caps in closed position. The "J"-shaped locking members maintain locking handles attached to a pair of control valves in the outlet in the closed position.

In U.S. Pat. No. 4,151,935, a technique is disclosed for taking a sample of the lading utilizing the large headed bolts and "J"-shaped locking members described in Ser. No. 844,666 by spacing the "J"-shaped locking members from the operating handle at opposite ends of the outlet a distance sufficient to allow rotation of the operating handle from the near end of the outlet a distance sufficient to take a sample before the "J"-shaped locking members on the opposite end of the outlet are abutted.

SUMMARY OF THE INVENTION

In a pneumatic discharge outlet a rotatable discharge conduit attached to a rotatable lading control valve extends outboard of the outlet end wall. Operating handles to move a lading control valve between open and closed positions are located on a hub on the discharge conduit. Laterally spaced, large headed bolts, extending outwardly parallel to the discharge conduit, are threaded into respective threaded portions of the operating handles. An outlet end cap includes laterally spaced end cap lugs through which the large headed bolts pass. In closed position the heads of the large headed bolts engage the end cap lugs to hold the end cap in closed position. To remove the end cap the large headed bolts are rotated an amount sufficient to free the end cap lugs from the large headed bolts so that the end cap may be removed from the discharge conduit. The large headed bolts preferably have bolt stops attached to their inner ends to prevent removal of the bolts when the end cap is removed. At least one end wall stop is provided on each outlet end wall located relative to the inner end of the large headed bolts such that at least one of the large headed bolts and, hence the operating handle, cannot be rotated when the large headed bolt is in engagement with the end wall stop. This handle position corresponds to the closed position of the control valve. A discharge conduit stop is located on the rotatable discharge conduit which engages the rotational stop in full open position. If an end cap is removed from one end of the outlet to take a sample, the large headed bolt at the opposite end of the outlet is rotated away from the end wall stop located at the opposite end. Thus, the control valve can be rotated a sufficient distance from the near end that a sample can be taken from one end of the outlet without the large headed bolt at the opposite end of the outlet abutting the end wall stop at the opposite end.

DESCRIPTION OF PREFERRED EMBODIMENTS

Figure 1:
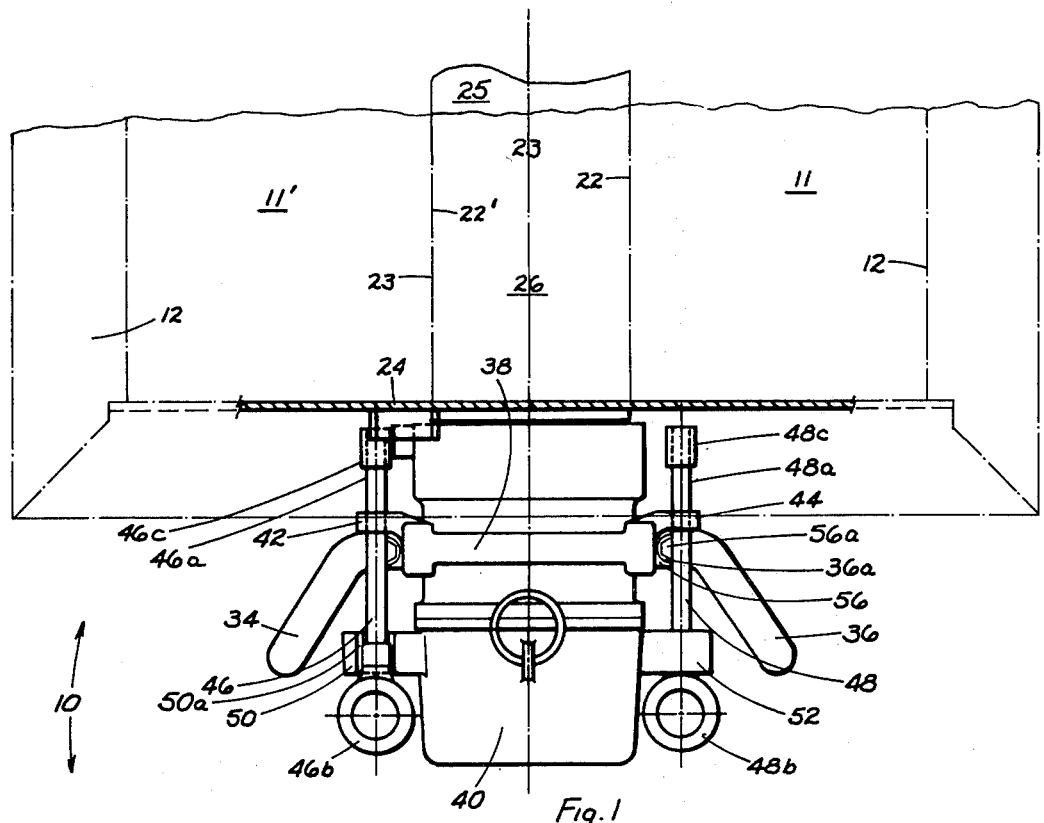

In the drawings a pneumatic outlet 10 includes a pair of side walls 11, 11' extending inwardly and downwardly from a flange portion 12 used to mount the outlet on the hopper of a railway hopper car. A discharge opening 23 is defined between the lower inner ends 22, 22' of the side walls 11, 11'. At each end of the outlet an end wall 24 is provided, one of which is illustrated in FIG. 1. A fixed discharge conduit 25 located between end walls 24 is located below opening 23. A control valve 26 is located so as to be movable between open and closed positions relative to the discharge opening 23. An example of a suitable control valve is disclosed in U.S. Pat. No. 3,778,114, hereby incorporated into the present application by this reference.

A rotatable discharge conduit 30 attached to control valve 26 is rotatably mounted upon each end wall 24 and/or fixed discharge conduit 25 and extends outwardly beyond the end walls 24. The rotatable discharge conduit includes a hub 32 upon which is mounted a pair of handles 34 and 36 connected together by a circular ring 38. As is described in greater detail in U.S. Pat. No. 3,778,114, the handles 34 and 36 move the control valve 26 between open and closed positions. An end cap 40 is provided to close the outer end 39 of the discharge conduit 30.

Handles 34 and 36 include vertical projections 42 and 44 which are internally threaded. Large headed bolts 46 and 48 located on opposite sides of the discharge conduit 30 are threaded at their inner portions as indicated at 46a and 48a. These large headed bolts are threaded into the vertical projections 42 and 44 of the handles. The large headed bolts 46 and 48 are conveniently eye bolts having eyes 46b and 48b. In closed position the eyes 46b and 48b engage respective lugs 50 and 52 extending transversely outwardly from the end cap 40 and having upwardly and downwardly extending openings 50a and 52a to allow the end cap to be removed from the handles. Bolt stops 46c and 48c are threaded onto the respective inner threaded portions 46a and 48a.

Thus bolts 46 and 48 can be turned sufficiently relative to handle projections 42 and 44 to move the eye portions 46b and 48b outwardly from the end cap sufficiently far to remove the lugs and end cap from the discharge conduit. However, in this position, the bolt stops 46c and 48c will abut the projections 42 and 44 and prevent loss of the bolt.

Circular strap 38 is attached to handles 34 and 36 by means of flanges 54 and 56 and fasteners 54a and 56a extending into slots 34a and 36a in handles 34 and 36.

Figure 3:
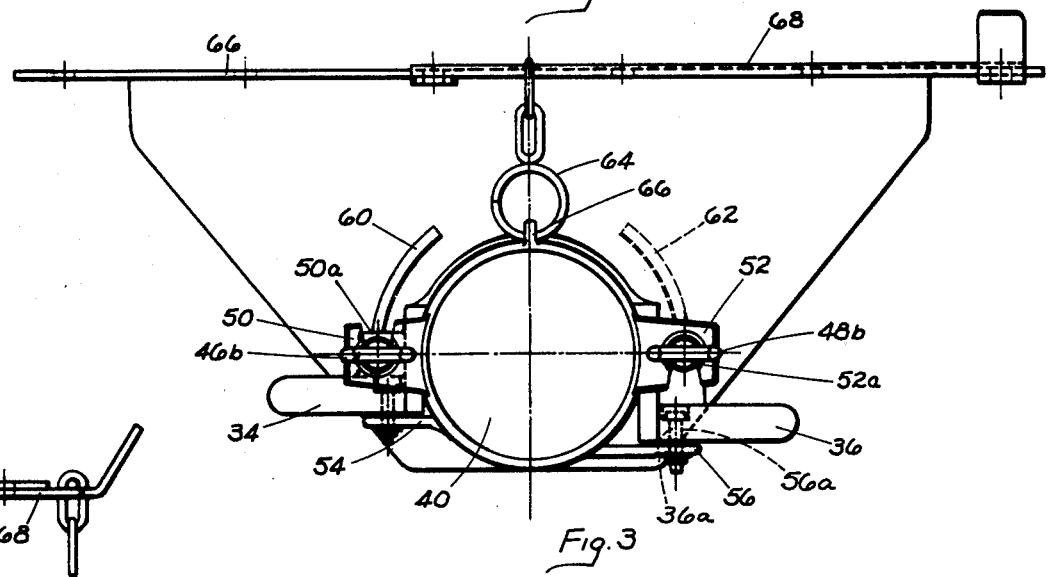

Semi-circular end wall stops 60 and 62 are welded to opposite ones of end walls 24 (FIG. 3). When eye bolt 46 is in the closed position engaging cap lug 50 and control valve 26 is in the closed position which corresponds to the position shown in FIG. 2 of handles 34 and 36, it will be seen that stop 60 prevents significant rotation of handle 34 in a clockwise direction. Stop 62 performs the same function at the opposite end of the outlet. A discharge conduit stop 63 is also mounted on discharge conduit 30 to provide an open position stop when stop 63 abuts stop 60 in the full open position.

A chain 64 is attached to end cap 40 by means of opening 66. The chain extends to an outwardly extending plate 68, extending transversely of the discharge conduit which allows the end cap to be held in place when it is removed from the discharge conduit 30.

Figure 2:
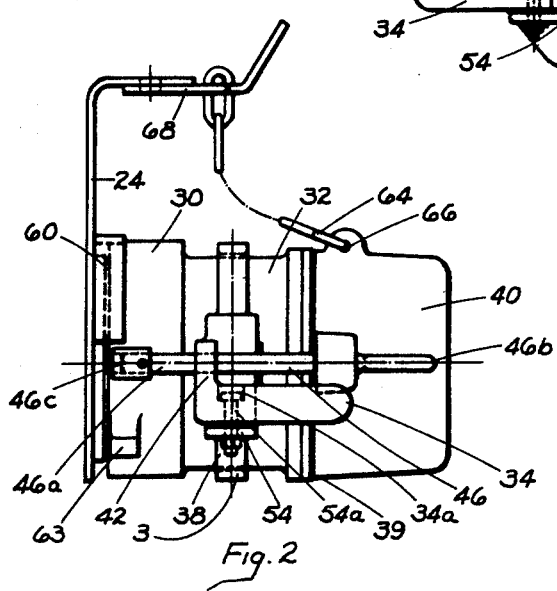

The position of the handles 34 and 36 in FIGS. 2 and 3 corresponds to the fully closed position of the control valve. To move the control valve toward open position, the large headed bolts 46 and 48 are rotated outwardly relative to handle projections 42 and 44 until the stop 46c is no longer obstructed by the stop 60 and until such time as the end cap 40 can be removed from bolts 46 and 48 by means of slots 50a and 52a. The end cap is then moved longitudinally along the plate 68 and a discharge transfer conduit attached to the discharge conduit end 39. The control valve is then moved between open and closed positions by means of handles 34 and 36 in the manner described in U.S. Pat. No. 3,778,114. In the full open position, discharge conduit stop 63 engages end wall stop 60.

After the unloading operation the discharge transfer conduit is removed and the end cap is replaced on the discharge conduit 30. The eye bolts 46 and 48 are then rotated into a position engaging end cap lugs 50 and 52 and wherein bolts 46 and 48 are located in the position shown in FIGS. 2 and 3. It is seen that in this position the stop 46c is located close to end wall stop 60 and rotation is prevented.

At the opposite end of the outlet, another conduit stop (not shown) is located below end wall stop 62.

In order to take a sample of the lading from the near end of the car, eye bolts 46 and 48 are rotated to an open position allowing end cap 40 to be removed from the discharge conduit and a sampling conduit is attached to rotatable discharge conduit 30. In this position the bolt stop 46c is not obstructed by the stop 60. The operator obtains a sample of the lading by rotation of control valve 26 by means of handles 34 and 36 on the near end of the outlet until stop 63 engages stop 60. At the opposite end of the outlet the stop at that end corresponding to stop 63 is rotated away from stop 62. There is approximately 180 degrees of rotational freedom at that end. Thus stop 63 first bottoms out on stop 60 at the near end.

After the sample has been obtained, the end cap on the near end is replaced and the bolts 46 and 48 are rotated into the closed position engaging end cap lugs 50 and 52.

It will be apparent that the same procedure may be utilized to take a sample of the lading from the left end of the outlet in FIGS. 1 and 2 without removing the end cap on the right hand side of FIGS. 1 and 2.

It is thus apparent that with the end cap arrangement of the present invention, the bail and lever arrangement described in U.S. Pat. No. 3,701,460 is not required. Furthermore, it is not necessary to remove the end cap from the opposite end of the outlet in order to take a sample of the lading.

What is claimed is

1. In a pneumatic discharge outlet, a rotatable discharge conduit attached to a rotatable lading control valve extending outboard of the outlet end wall; operating handles to move said lading control valve between open and closed positions located on said discharge conduit; laterally spaced, large headed bolts located on opposite sides of the discharge conduit, and extending parallel to the discharge conduit; said bolts threadably engaging a portion of said operating handles, whereby in moving said control valve between open and closed positions, said large headed bolts move circumferentially about the discharge conduit with said handles; an outlet end cap covering said discharge conduit including laterally spaced end cap lugs having openings through which said large headed bolts pass; in closed position the heads of the large headed bolts engaging said end cap lugs to hold the end cap in closed position; said large headed bolts being rotatable in said handles an amount sufficient to free said end cap lugs from said large headed bolts so that said end cap may be removed from the discharge conduit; and at least one end wall stop provided on said outlet end wall located relative to the inner end of one of said large headed bolts such that at least one of the large headed bolts and its associated operating handle cannot be rotated when the large headed bolt is in engaged position with the end cap and wherein this position of the operating handle corresponds to the closed position of said control valve.

2. A pneumatic discharge outlet according to claim 1 wherein a discharge conduit stop is located on said discharge conduit which engages said end wall stop in full open position.

3. A pneumatic discharge outlet according to claim 1 wherein said large headed bolts have bolt stops attached to their inner ends whereby removal of the bolts from said handles when said end cap is removed is prevented and wherein at least one of said bolt stops engages said end wall stop in closed position.

4. In a pneumatic discharge outlet, a rotatable discharge conduit attached to a rotatable control valve and extending outboard of outlet end walls located at opposite ends of the outlet; operating handles to move said control valve between open and closed positions located on said discharge conduit at opposite ends of the outlet; laterally spaced, large headed bolts located on opposite sides of the discharge conduit at each end of the outlet, parallel to the discharge conduit and threadably engaging a portion of said operating handles, whereby in moving said control valve between open and closed positions, said large headed bolts move circumferentially about said discharge conduit with said handles; an outlet end cap covering said discharge conduit at each end of the outlet, including laterally spaced end cap lugs having openings through which said large headed bolts pass; in closed position the heads of the large headed bolts engaging said end cap lugs to hold the end cap in closed position; said large headed bolts being rotatable in said handles an amount sufficient to free said end cap lugs from said large headed bolts so that said end cap may be removed from the discharge conduit; one end wall stop located on each outlet end wall located relative to the inner end of said large headed bolts such that at least one of the large headed bolts and its associated operating handle cannot be rotated when the large headed bolt is in engaged position with the end cap and wherein this position of the operating handle corresponds to the closed position of said control valve, and wherein said end wall stops on each end of the outlet are located such that, if the end cap is removed from the one end of the outlet, the control valve can be rotated a sufficient distance such that a sample can be taken from the said one end of the outlet without the large headed bolt at the opposite end of the outlet abutting the end wall stop at said opposite end.

5. A pneumatic discharge outlet according to claim 4 wherein when a sample is being taken from one end of the outlet the extent to which the control valve is rotatable is governed by the spacing between a discharge conduit stop and said end wall stop.

6. A pneumatic discharge outlet according to claim 5 wherein said large headed bolts have bolt stops attached to their inner ends whereby removal of the bolts from said handles when said end cap is removed is prevented, and wherein at least one of said bolt stops engages said end wall stop in closed position.

* * * * *